United States Patent [19]

Blachford

[11] 4,002,474
[45] Jan. 11, 1977

[54] LUBRICANTS FOR POWDERED METALS

[75] Inventor: John Blachford, Westmount, Canada

[73] Assignee: H. L. Blachford Limited, Montreal, Canada

[22] Filed: July 31, 1975

[21] Appl. No.: 600,777

[52] U.S. Cl. .................................. 75/211; 75/214; 264/111

[51] Int. Cl.² .......................................... B22F 3/00

[58] Field of Search ............... 75/211, 214; 264/111

[56] References Cited

UNITED STATES PATENTS

| | | | |
|---|---|---|---|
| 3,305,358 | 2/1967 | Lirones | 75/211 |
| 3,728,110 | 4/1973 | Klar et al. | 75/214 |
| 3,776,987 | 12/1973 | Grimes et al. | 75/211 |
| 3,781,170 | 12/1973 | Nakao et al. | 75/211 |
| 3,929,476 | 12/1975 | Kirby et al. | 75/211 |

Primary Examiner—Brooks H. Hunt
Attorney, Agent, or Firm—Bacon & Thomas

[57] ABSTRACT

Discrete pressure-rupturable microcapsules for lubrication in powder metallurgy are disclosed comprising a core and a solid shell surrounding said core; the core comprises an organic liquid lubricant able to wet powdered metals, the shell comprises a thin non-atmospherically degradable polymeric material; the microcapsules may be used as the sole lubricant in the manufacture of sintered metal parts or may be used in admixture with other solid lubricants to produce beneficial synergistic effects.

12 Claims, 4 Drawing Figures

FIG. 4 RESULTS FOR BLENDS OF MICROCAPSULES AND ETHYLENEBISSTEARAMIDE FOR TOTAL LUBRICANT CONCENTRATION OF 1% AND MICROCAPSULES FROM EXAMPLE VIII AND POWDERED METAL CZ-2

LUBRICANTS FOR POWDERED METALS

BACKGROUND OF THE INVENTION a. Field of the Invention

This invention relates to lubricants for powder metallurgy and to the manufacture and use of lubricants.

More particularly the lubricant comprises a microcapsule comprising a core of a liquid lubricant enclosed by a solid shell.

b. Description of Prior Art

Powdered metals, for example, powdered iron, are used to make small, fairly intricate parts, for example, gears. The fabrication of such metallic parts by powdered metal technology involves the following steps:

a. the powdered metal is blended with a lubricant and other additives to form a mixture, b. the mixture is poured into a mould, c. the mixture is compacted in the mould to form a part using a high pressure, usually of the order of 30 tons per square inch, d. after compaction the part is ejected from the mould, e. the ejected part is subjected to a high temperature to decompose and remove the lubricant, f. the part is heated to a higher temperature to cause all the particles of metal in the part to sinter together and g. the part is cooled, after which it is ready for use.

Commonly used lubricants include zinc and lithium stearate.

The lubricant is added to the powdered metal for several reasons; it increases the bulk density of the uncompacted powdered metal. This means that the moulds can be shallower, for a given thickness of the final part. The bulk density is generally referred to as the "apparent density".

The lubricant allows the compacting pressure to be reduced to attain a specified density before sintering. This is very important because it means that for a given pressure a larger part can be made. Because of the very large pressures required to compact powdered metal, only relatively small parts are made. The density of the compacted part is called the "green density".

The ejection force to remove the compacted part from the mould is much lower when a lubricant is present and this lower force results in less mould wear.

Unfortunately, the lubricant also has a few adverse effects; it reduces the flow rate of the powdered metal and therefore the rate at which a mould can be filled; it reduces the strength of the compacted part, referred to as the "green strength"; further, it can cause an unattractive surface finish on the sintered part. Zinc stearate is commonly used as a lubricant and slowly deposits a thin coating of zinc on the walls of the oven used to burn off the lubricant or on the walls of the sintering oven.

This last disadvantage is often serious, and because of it a wax is sometimes used instead of zinc stearate. The most commonly used wax is ethylenebisstearamide; however, it is not as good a lubricant as zinc stearate, especially with regard to compressibility, i.e., lower green densities for a given compacting pressure. It can only provide the same compressibility as zinc stearate if it is ground to a very fine powder using a special grinding mill which is expensive and consumes a great deal of energy.

A further disadvantage to customarily used lubricants is that they are dusty.

SUMMARY OF THE INVENTION

The present invention provides an entirely or almost entirely organic lubricant for powder metallurgy which provides at least as great a compressibility as zinc stearate, and which is comparable to zinc stearate with respect to other effects on the powdered metal.

The invention further provides an organic powdered metal lubricant which is cheap, dustless, non-toxic, and which can be used in quantities no greater than now used for existing lubricants, for example, zinc stearate, lithium stearate and waxes.

The invention further provides a lubricant composition which comprises a synergistic mixture of microencapsulated lubricant and unencapsulated solid lubricant.

The invention further provides a process by which the microencapsulated lubricant can be manufactured.

The invention further provides a method of producing a sintered metal part using the lubricant of the invention.

It has been found that small capsules called microcapsules consisting of a liquid lubricant surrounded by a solid shell material, having certain properties, provide an excellent lubricant for powdered metals.

The addition of a liquid lubricant to powdered metal results in high compressibility and low ejection pressure, however, it also causes very poor flow and very low apparent density which are unacceptable.

When the liquid lubricant is encapsulated, however, according to the present invention it does not have an opportunity to reduce the flow rate or the apparent density of the powdered metal; however, when the mixture of powdered metal and encapsulated lubricant is subjected to high pressure during the compaction stage, the shell of the capsule is ruptured or broken and the liquid lubricant is released to coat the particules of powdered metal and the die wall, and thereby results in high compressibility and low ejection pressure.

According to one aspect of the invention there is provided discrete pressure-rupturable microcapsules for lubrication in powder metallurgy comprising a core and a solid shell surrounding said core; said core comprising a non-corrosive organic liquid lubricant able to wet powdered metals and said shell comprising a thin non-atmospherically degradable polymeric material; said shell being impermeable to said lubricant and having a smooth, slippery outer surface having a high resistance to abrasion by powdered metals; said shell being rupturable when subjected to powder metallurgy compacting pressures; said lubricant and said shell being heat decomposable to non-corrosive gaseous products with a minimum residue of carbon at elevated temperatures below the sintering temperature of powdered metal.

According to another aspect of the invention there is provided a free-flowing lubricant composition for powder metallurgy lubrication comprising the discrete pressure rupturable microcapsules defined above in admixture with a solid particulate lubricant for examle an amide wax or a metal stearate, such mixtures exhibit beneficial synergistic effects.

According to another aspect of the invention there is provided a method of producing a sintered metal part from powdered metal comprising blending said powdered metal with a lubricant comprising discrete pressure-rupturable microcapsules comprising a core of a liquid organic non-corrosive lubricant able to wet said powdered metal and surrounding said core a thin polymeric solid shell to form an intimate mixture, compacting said mixture in a mould at a pressure effective to rupture said sheel and release said liquid lubricant, and to form said mixture into a self-supporting shaped body, removing said body from said mould, heating said body to decompose and remove said lubricant and shell and sintering said metal particles.

According to yet another aspect of the invention there is provided a process for producing solid lubricant coated discrete pressure rupturable microcapsules, comprising a core of a liquid organic lubricant and a solid polymeric shell surrounding said core comprising forming a mixture of the liquid lubricant and a polymerizable monomer soluble therein, forming an emulsion of the mixture with a polar solvent immiscible with said liquid lubricant, reacting said monomer with a polar solvent-soluble monomer or catalyst to produce microcapsules comprising a core of said liquid lubricant and a shell of polymerized monomer or monomers, mixing the microcapsules with the solid lubricant at a temperature above the melting point of the solid lubricant to coat the microcapsules and recovering coated microcapsules.

LIQUID LUBRICANT

With regard to the physical properties of the lubricant it should be liquid at the temperatures at which it is used, the melting point should be below room temperature, or more precisely, below the temperature of the powdered metal when it is compacted. It should have a low enough viscosity so that when the shell is ruptured the lubricant will rapidly flow out and envelop the particles of powdered metal. A viscosity below 300 cp should suffice.

The liquid lubricant must have the ability of wetting the powdered metal. This is generally dependent on the surface tension properties and generally if the surface tension of the lubricant is below about 40 dynes/cm., good wetting should occur. The liquid lubricant should not be soluble in the shell material or it will tend to slowly diffuse through the shell. Since lubricants are frequently burned off at 800° F. prior to sintering, almost all the liquid should desirably decompose below this temperature. The remaining lubricant should completely burn off in the sintering oven so that very little black soot is deposited on the surface of the sintered part.

With regard to chemical properties the liquid lubricant should not be corrosive, and should not yield corrosive degradation products or yield degradation products which adversely affect the lining of the sintering furnace or the properties of the sintered metal parts. These requirements eliminate such lubricants as chlorinated and sulphonated fats and oils.

Liquid lubricants which have been found to be suitable are animal and vegetable fats and oils which have the required low melting points. Examples are rapeseed oil, soya-bean oil, peanut and coconut oil. Fatty acids and fatty acid esters are also suitable, provided they have low enough melting points. Examples are oleic acid, methyl laurate and the methyl ester of lard oil, epoxidized fats and oils which are liquids, such as, epoxidized soya-bean oil, may be used. Mineral oils and low melting point polyethylenes and polypropylene glycols can also be used, but are less preferred.

Small amounts of special additives may be mixed with the liquid lubricant, even though if present in large amounts they would be deleterious. Examples of these are chlorinated oils, sulphonated oils, tricresyl phosphate, zinc dithiodialkylphosphates and sodium nitrite.

The lubricant may also contain small amounts of solid lubricants, for example, molybdenum disulphide.

The amount of liquid lubricant present in the microcapsules should be as great as possible, because the shell material itself is not a good lubricant. Large amounts may be employed, provided difficulties are not encountered in the formation of a continuous shell and the shell is sufficiently strong. Usually the lubricant content varies between 50% and 85% by weight.

SHELL

The chemical properties required of the shell material are the same as for the liquid lubricant. With regard to physical properties the shell material must satisfy several criteria. The shell should be impermeable to the liquid lubricant. The surface of the shell must be sufficiently smooth and slippery so that a good flow rate and apparent density is obtained for the mixture of powdered metal, lubricants and other additives. Neither moisture in the air nor oxygen should degrade the shell.

The shell material should have a high abrasion resistance so that while the microcapsules are being mixed with the powedered metal the shell will not abrade away with release of the liquid lubricant. During this mixing operation the temperature may reach as high as 130° F. and therefore the shell should be able to withstand this temperature. A further and rather obvious requirement, is that the shell should rupture when subjected to the pressure exerted during compaction. It is also desirable that the shell material be such that thin shells can be utilized so that the percentage of liquid lubricant is high.

MICROCAPSULE

The size, shape and colour of the microcapsules are important. If the microcapsules are too large they will segregate from the powdered metal. If all of the microcapsules pass through a 140 mesh sieve there is no danger of segregation.

Generally, it is preferable to have the microcapsules as fine as possible, for example, 5 microns in diameter. Coarser microcapsules lead to lower apparent densities, lower green densities, and higher ejection pressures. However, they also lead to higher flow rates; therefore, when a high flow rate is paramount, coarse particles should be used, for example, 50 microns in diameter. Generally the microcapsule will have a size in the range of about 1 to 200, particularly 5 to 100 microns, however, the most suitable microcapsule size is also dependent on the particular grade of iron or non-ferrous metal powder.

A spherical shape is the most desirable, because this leads to the highest flow rate and apparent density. A black or grey colour is undesirable, particularly when the powdered metal is iron powder, because it is then impossible to determine whether the microcapsules have been thoroughly blended with the powdered metal; white is the preferred colour.

In one embodiment of the invention the shell of the microcapsules is coated with a thin layer of a solid which is a good lubricant for powdered metals, for example, stearic acid or carnauba wax. This coating results in an improvement in the apparent density and flow rate, without harming the other properties. Preferably, the coating constitutes between 5% and 15% of the total weight of the microcapsules. If it is much less, the coating will not completely cover the shell; if it is much more, the beneficial effects of the encapsulated liquid lubricant will be reduced.

In another embodiment of the invention the microencapsulated lubricant is mixed with an unencapsulated solid particulate lubricant because synergism occurs with respect to compressibility and ejection force; the compressibility reaches a maximum at a particular concentration of microcapsules, and the ejection force reaches a minimum at another, usually different, concentration of microcapsules; the values of these concentrations depend upon the particle size and the composition of the microcapsules and of the unencapsulated solid particulate lubricant. Suitable solid particulate lubricants include waxes, for example, ethylenebisstearamide, carnauba wax, Fischer Tropsch wax, fatty acids, zinc stearate and lithium stearate.

MICROCAPSULE PRODUCTION

There are several methods of microencapsulating a liquid and most of these can be applied to the microencapsulation of liquid lubricants. U.S. Pat. Nos. 2,800,457, 3,041,288 and 3,201,353 involve the formation of a shell by the precipitation of gelatin; in U.S. Pat. No. 3,137,631 other proteins are used to form the shell. Precipitation of synthetic polymers is employed in U.S. Pat. No. 3,173,878 to produce a shell. U.S. Pat. No. 2,969,330 entails shell formation by the polymerization of a monomer at the interface of the oil and water in which the oil is emulsified. In U.S. Pat. No. 3,796,669 the shell formation is by the copolymerization of two monomers in an emulsion of an oil and water.

Although encapsulation methods using gelatin are the most popular and have been thoroughly investigated, they are not particularly suitable for the present application because, in addition to other reasons, the gelatin shells are moisture sensitive and the surfaces are often tacky; a tacky surface causes low flow rates and low apparent densities.

U.K. Pat. No. 950,443 involves a method which is similar to that preferred in the present invention. In this case, microcapsules are formed by a condensation polymerization reaction between a monomer which is soluble in a water phase and a monomer soluble in a water immiscible phase.

The microcapsules may be manufactured by a method comprising the following steps: (1) Mix a lubricant soluble monomer with the liquid lubricant, (2) add the resulting mixture to water which contains an emulsifying agent, (3) mix at room temperature using vigorous agitation to form an emulsion of fine droplet size, (4) to the emulsion add, with mixing, a water soluble monomer reactive with the lubricant soluble monomer or a polymerization catalyst for the lubricant soluble monomer, (5) heat to approximately 80° C. and mix, but not vigorously, for several hours, (6) filter the mixture to separate the microcapsules from the water, (7) wash the microcapsules to remove emulsifying agent and any excess water soluble monomer and (8) dry the microcapsules.

The liquid lubricant should, of course, be inert to and not interfere with the polymerization. In this respect fatty acids should be avoided as the liquid lubricant when the isocyanate/amine reaction is employed because the fatty acids and amines tend to react together preventing or hindering the formation of microcapsules.

To coat the microcapsules with a thin layer of a solid lubricant, the mass of dried microcapsules is heated to a temperature a little above the melting point of the solid lubricant; the solid lubricant is then added, preferably as a fine powder, and the mixture is mixed gently for about an hour while the temperature is held constant. Finally, with continuous mixing, the temperature is allowed to slowly decrease to that of the room. It is generally found that several aggregates of microcapsules have formed during this process because of the bonding nature of the solid lubricant. These can easily and completely be broken by grinding lightly in a hammer mill.

In the preferred method a di- or polyfunctional isocyanate is dissolved in the liquid lubricant; the resulting solution is emulsified in water containing an appropriate emulsifying agent, and an aqueous solution of a di- or polyfunctional amine is added. Among the isocyanates that can be used there may be mentioned:
toluene diisocyanate
diasisidine diisocyanate
xylylene diisocyanate
bitolylene diisocyanate
hexamethylene diisocyanate
o,m and p-phenylene diisocyanate
methylene bisphenylisocyanate
polymethylene polyphenylisocyanate
1,6-hexamethylene diisocyanate
methylcyclohexylene diisocyanate
trimethylhexamethylene diisocyanate Examples of amines that can be used in the method are the following:
ethylene diamine
methane diamine
1,3 diaminocyclohexane
m-xylylenediamine
diethylenetriamine
iminobispropylamine
propylenediamine
tetraethylenetetramine
tetraethylenepentamine
m-phenylenediamine
4,4'-methylenedianiline Examples of liquid lubricants which can be used in the preferred encapulation method are as follows:
rapeseed oil
soyabean oil
epoxidized soyabean oil
methyl lardate
methyl laurate
peanut oil
methyl oleate
corn oil When mixed with metal powders, the concentration of the microcapsules or of microcapsules plus unencapsulated solid lubricants, is suitably in the range of 0.1% to 5% by weight, preferably from 0.3% to 1% by weight.

BRIEF DESCRIPTION OF DRAWINGS

Test data on lubricant compositions of the invention are illustrated with reference to the accompanying drawings in which.

Description of Preferred Embodiments

The following examples serve to illustrate the invention, but they are not intended to limit it thereto.

EXAMPLE I

Rapeseed oil encapsulated in the reaction product from ethylene diamine and toluene diisocyanate.

30 g. of toluene diisocyanate (Nacconate 80, trademark from Union Carbide) was dissolved in 120 g. of refined rapeseed oil. This solution was added with stirring to a solution of 3 g. of Siponic 218 (trademark for a polyoxyethylene thioether from Alcolar, Inc.) in 700 g. of water. When the emulsification was complete, the stirring rate was reduced and 30 g. of ethylene diamine dissolved in 70 g. of water was added. The temperature was then increased to 80° C. and maintained constant while the mixture was stirred for 4 hours.

The resulting dispersion of microcapsules in water was filtered and the microcapsules dried at 60° C. Aggregates of microcapsules were broken by light grinding through a hammer mill.

The microcapsules were white, spherical, free flowing, had an average particle size of about 50 microns and contained about 66% by weight of rapeseed oil.

EXAMPLE II

Methyl oleate encapsulated in the reaction product from ethylene diamine and toluene diisocyanate.

30 g. of toluene diisocyanate was dissolved in 120 g. of methyl oleate. This solution was added with stirring to a solution of 3 g. of Siponic 218 (trademark) in 700 g. of water. When the emulsification was complete the stirring rate was reduced and 30 g. of ethylene diamine dissolved in 70 g. of water was added. The temperature was increased to 80° C. and maintained constant while the mixture was stirred for 4 hours.

The microcapsules were separated from the water by filtration and then dried at 60° C. Aggregates of dried microcapsules were broken by light grinding with a hammer mill.

The microcapsules were white, spherical, free flowing, had an average particle size of about 50 microns, and contained about 66% by weight methyl oleate.

EXAMPLE III

Testing of Microcapsules prepared in Examples I and II.

The microcapsules prepared in Examples I and II were tested as lubricants for two different powdered metals using the following formulations:

| Formulation A | | Formulation B | |
|---|---|---|---|
| Iron Powder (QMP's Atomet 29*) | 95.10% | Iron Powder (Domtar's MP32*) | 96.28% |
| Graphite (Southwestern's 1845*) | 0.94% | Graphite (Southwestern's 1845*) | 0.99% |
| Copper (Alcan's MD151*) | 2.960% | Copper (Alcan's MD151*) | 1.98% |
| Lubricant | 1.00% | Lubricant | 0.75% |

*Trademark

Standard test methods were used to determine the effects of the lubricant, namely apparent density by ASTM B212-48, compressibility by ASTM B331-64, green strength by ASTM B312-64, transverse rupture strength by ASTM B528-70 and tensile strength by ASTM E8.

A compacting pressure of 27.5 tons/sq.in. was used to prepare specimens of Formulation A for tensile strength determinations and of 30 tons/sq.in. for transverse rupture. A compacting pressure of 25 tons/sq.in. was used to prepare specimens of Formulation B for tensile and transverse rupture strength determinations.

Following compaction the samples were subjected to 1000° F. in a pure hydrogen atmosphere for 20 minutes to burn off the lubricant, and subsequently to 2050° F. for 30 minutes to sinter the metal.

Tables I and II present the results, along with the corresponding results for two commercially used lubricants, zinc stearate and ethylenebisstearamide wax. It can be seen that compared to the stearate and the wax the use of microcapsules leads to much lower ejection force, to lower apparent density and to greater shrinkage. With regard to the other parameters the results are comparable. A high shrinkage is frequently desirable, and although the tensile strength obtained using encapsulated rapeseed oil is low, it is still acceptable.

TABLE I

| | Comparison Between Effects of Standard Lubricants and Microcapsule Lubricants for Formulation A | | | |
|---|---|---|---|---|
| | Zinc Stearate | Ethylenebis-stearamide Wax | Microcapsules from Example I | Microcapsules from Example II |
| Apparent Density in g/cc | 3.08 | 2.66 | 2.30 | 2.37 |
| Ejection Force in t.s.i. | 4.2 | 4.9 | 4.2 | 4.0 |
| Green Density in g/cc | 6.57 | 6.53 | 6.49 | 6.49 |
| Shrinkage in | | | | |

TABLE I-continued

Comparison Between Effects of Standard Lubricants and Microcapsule Lubricants for Formulation A

|  | Zinc Stearate | Ethylenebis-stearamide Wax | Microcapsules from Example I | Microcapsules from Example II |
|---|---|---|---|---|
| in./in. × 10$^{-4}$ | | | | |
| Length | 7 | 13 | 24 | 39 |
| Width | 6 | 10 | 24 | 36 |
| Thickness | 29 | 26 | 55 | 93 |
| Tensile Strength in p.s.i. | 54,140 | 61,050 | 57,000 | 56,390 |
| Transverse Rupture Strength in p.s.i. | 111,130 | 111,180 | 111,080 | 121,230 |

TABLE II

Comparison Between Effects of Standard Lubricants and Microcapsule Lubricants for Formulation B

|  | Zinc Stearate | Ethylenebis-stearamide Wax | Microcapsules from Example I | Microcapsules from Example II |
|---|---|---|---|---|
| Apparent Density in g/cc | 2.73 | 2.57 | 2.15 | 2.25 |
| Ejection Force in t.s.i. | 4.3 | 4.8 | 3.2 | 3.6 |
| Green Density in g/cc | 6.35 | 6.30 | 6.30 | 6.28 |
| Shrinkages in in./in. × 10$^{-4}$ | | | | |
| Length | 20 | 6 | 6 | 16 |
| Width | 12 | 6 | 4 | 14 |
| Thickness | 23 | 13 | 43 | 60 |
| Tensile Strength in p.s.i. | 37,890 | 37,260 | 28,640 | 37,730 |
| Transverse Rupture Strength in p.s.i. | 77,410 | 80,360 | 74,930 | 79,290 |

EXAMPLE IV

Soyabean oil encapsulated in the reaction product from Ethylenediamine and toluene diisocyanate.

30 g. of toluene diisocyanate was dissolved in 60 g. of soyabean oil (from Canlin Limited). This solution was added with stirring to a solution of 3 g. of Siponic 218 (trademark) in 700 g. of water. When the emulsification was complete, the stirring rate was reduced and 30 g. of ethylene diamine dissolved in 70 g. of water was added. The temperature was then increased to 80° C. and maintained constant while the mixture was stirred for 4 hours.

The microcapsules were separated from the water by filtration and then dried at 60° C. Aggregates of dried microcapsules were broken by lightly grinding in a hammer mill.

The microcapsules were white, spherical, free flowing had an average diameter of 50 microns, and contained about 50% by weight soyabean oil.

EXAMPLE V

Soyabean oil encapsulated in the reaction product from ethylene diamine and toluene diisocyanate.

The same procedure was followed as in Example IV except that more soyabean oil was added so that the microcapsules contained about 75% by weight oil.

EXAMPLE VI

Effect of mixtures of ethylenebisstearamide wax and microcapsules from Examples IV and V on Iron Powder.

Figure 1:
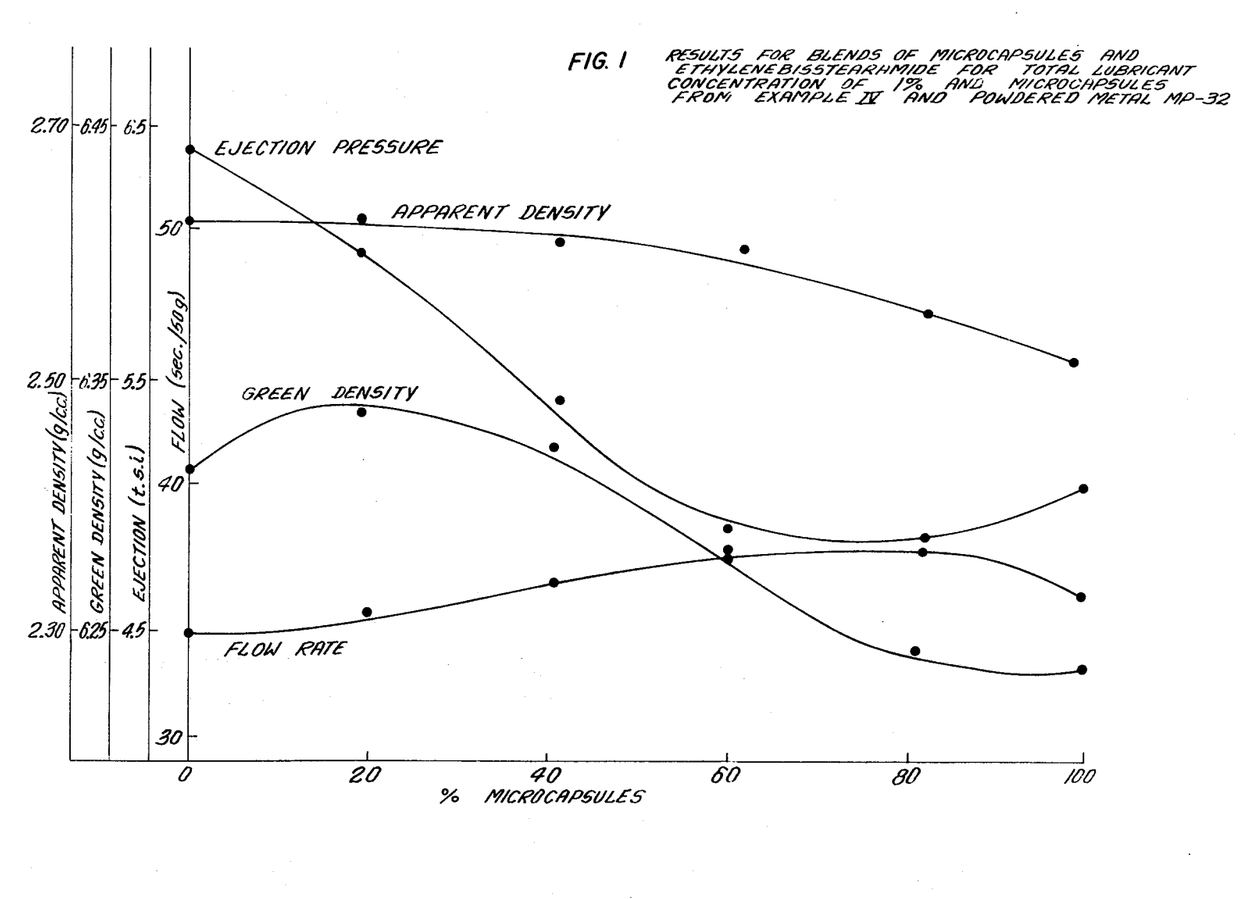
FIG. 1 shows graphically the variation in flow rate, green density, apparent density and ejection pressure for iron powder (MP-32, trademark) containing 1% by weight of lubricant comprising microcapsules admixed with particulate ethylenebisstearamide, with microcapsule concentration, for the microcapsule of Example IV.

Rather than using only microcapsules as a lubricant for powdered metals, blends of microcapsules with customary lubricants can be used. FIG. 1 gives the results for blends of ethylenebisstearamide wax (from H. L. Blachford, Limited) with microcapsules from Example IV where the total concentration of lubricant system is kept constant at 1% and the powdered metal is iron powder MP-32 (trademark) from Domtar. It is surprising to see that the cruve for green density shows a maximum, which occurs at approximately 20% microcapsule content. Similarly, the curve for ejection force shows a minimum, which occurs at approximately 75% microcapsule content. These two separate synergistic effects are beneficial, because a high green density and a low ejection force are desirable.

Blends were also prepared using microcapsules from Example V to determine the effect of increasing the oil content from 50% to 75% by weight. Although the results are not shown in FIG. 1, it was found that with the microcapsules containing more oil the apparent densities, flow rates, and ejection pressures were lower, but, the green densities were higher.

EXAMPLE VII

Soyabean oil encapsulated in the reaction product from ethylene diamine and toluene diisocyanate The same procedure was followed as in Example IV except that the amount of soyabean oil was increased to 120 g. so that the microcapsules contained about 66% by weight oil.

EXAMPLE VIII

Soyabean oil encapsulated in the reaction product from ethylene diamine and toluene diisocyanate.

30 g. of toluene diisocyanate was dissoved in 120 g. of soyabean oil. The solution was added with stirring to a solution of 3 g. of Siponic 218 (trademark) in 700 g. of water. The resulting coarse emulsion as then mixed very vigorously in a high intensity colloid mill to produce an emulsion containing very fine droplets of oil. The stirring rate was then reduced and 30 g. of ethylene diamine in 70 g. of water was added. The temperature was then increased to 80° C. and maintained constant while the mixture was stirred for 4 hours.

The microcapsules were separated from the water by filtration and dried at 60° C. Aggregates of dried microcapsules were broken by gentle grinding.

The microcapsules were white, spherical, free flowing, had an average diameter of 5 microns and contained about 66% by weight oil.

EXAMPLE IX

Effect of mixtures of ethylenebisstearamide wax and microcapsules from Examples VII and VIII on iron powder.

Figure 2:
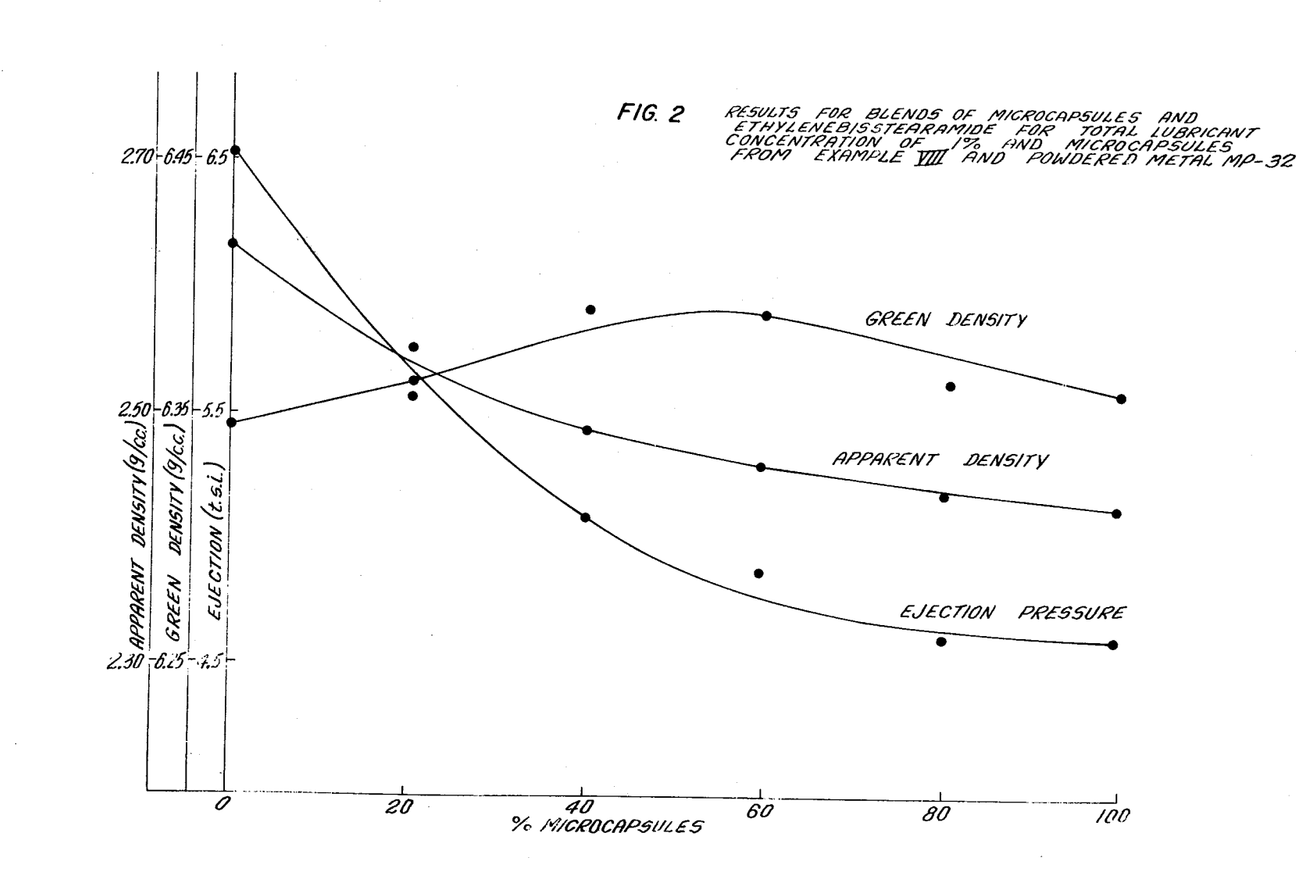
FIG. 2 shows graphically the variations in ejection pressure, apparent density and green density for iron powder (MP-32, trademark) containing 1% by weight of lubricant comprising microcapsules admixed with ethylenebisstearamide, with microcapsule concentration, for the microcapsules of Example VIII.

Rather then using only microcapsules as a lubricant for powdered metals, blends of microcapsules with customary lubricants can be employed. FIG. 2 gives the results for blends of ethylenebisstearamide wax with the fine particle size capsules from Example VIII. The total concentration of lubricant was held at 1% and the powdered metal was iron powder MP-32 (trademark) from Domtar. It is surprising to see that the curve for green density shows a maximum, which occurs at microcapsule content of approximately 50% by weight. The results shows that synergism occurs between the two different kinds of lubricant.

Blends were also prepared and tested using microcapsules from Example VII to determine the effect of microcapsule particule size. Although the results are not shown, it was found that using the coarser microcapsules resulted in a maximum in the green density, but it occurred at around 30% by weight microcapsule content, rather than 50% by weight as with the finer microcapsules. Furthermore, the apparent densities were lower. The ejection pressures were lower at low concentrations of microcapsules, but higher at high concentrations.

EXAMPLE X

Rapeseed oil encapsulated in the reaction product from ethylene diamine and toluene diisocyanate.

The same procedure was used as in Example VIII, except that rapeseed oil was used in place of soyabean oil. The microcapsules formed had an average diameter of approximately 5 microns and contained 66% by weight oil.

EXAMPLE XI

Effect of Mixtures of ethylenebisstearamide wax and microcapsules from Examples I and X on iron powder.

Figure 3:
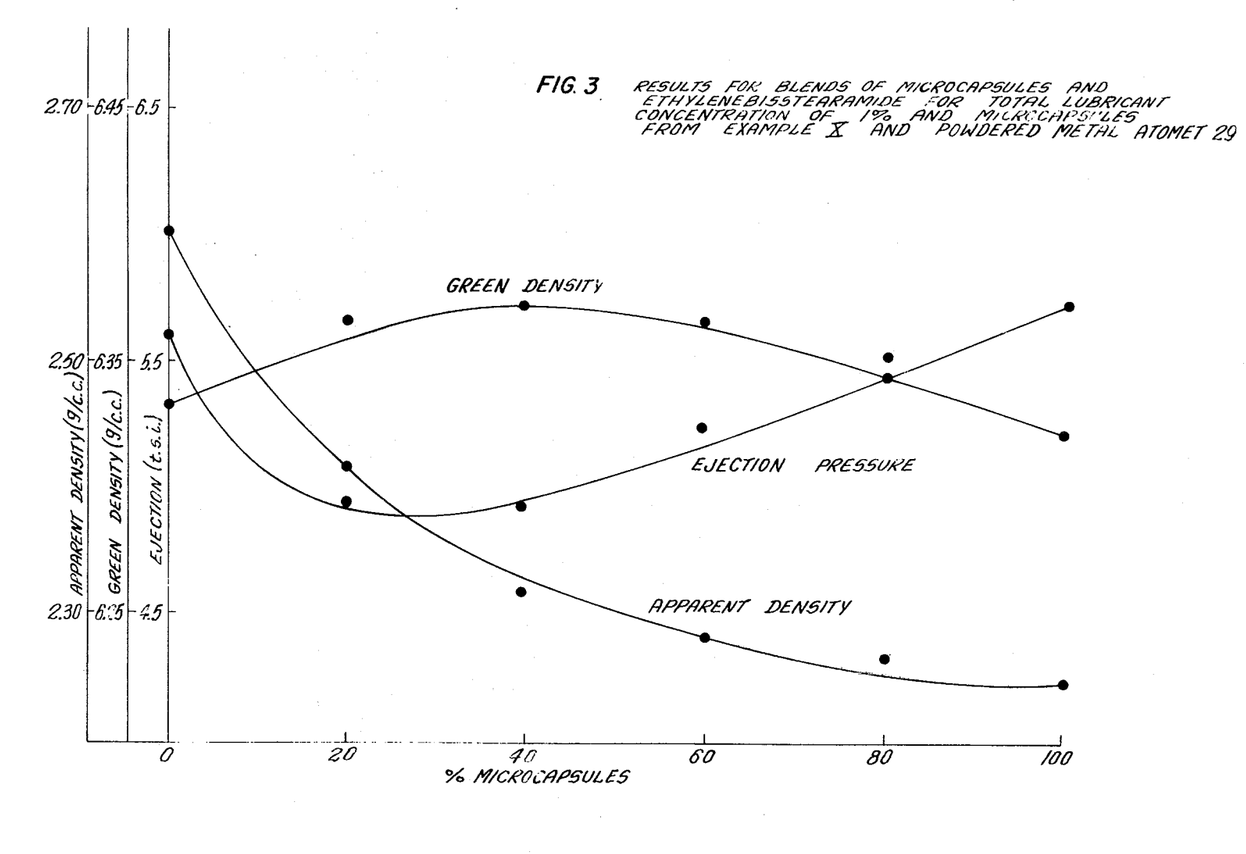
FIG. 3 shows graphically the variation in ejection pressure, apparent density and green density for iron powder (Atomet 29, trademark) containing 1% by weight of lubricant comprising microcapsules admixed with ethylenebisstearamide, with microcapsule concentration, for the microcapsules of Example X.

Blends of microcapsules and a conventional lubricant were prepared and tested in iron powder Atomet 29 (trademark), from Quebec Metal Powder Company. FIG. 3 gives the results for blends of ethylenebisstearamide wax with the fine particle size capsules from Example X. The total concentration of lubricant was kept constant at 1% by weight. The results are similar to those given in Examples VI and VIII. A maximum green density occurs at a microcapsule concentration of approximately 40% by weight. As in Example VI there is a minimum in the curve for ejection pressure. Beneficial synergism occurs here also, with regard to both green density and ejection pressure.

Blends were also prepared and tested using microcapsules from Example I. These capsules are identical to those from Example X, except that they are much larger. Although the results are not shown, it was found that the green density reaches a maximum at a lower microcapsule concentration. The ejection pressures and apparent densities are higher.

EXAMPLE XII

Coating of microcapsules from Example VIII with thin layers of lubricants.

A 166 g. sample of fine microcapsules from Example VIII was heated to 150° F. and to half of this was added, with mixing, 17 g. of double pressed stearic acid and to the other half was added, with mixing, 17 g. of a Fischer Troposch Wax (Paraflint — trademark). The samples were held at 150° F. and mixed for 30 minutes. The heat source was then removed and the samples allowed to cool to room temperature, at which point the mixing was stopped. The aggregates that had formed as a result of this treatment were broken by light grinding.

The coated microcapsules were tested as lubricants for iron powder, Atomet 29 (trademark) using a lubricant concentration of 0.75% by weight.

TABLE III

| Effect of Thin Coating on Lubricant Properties | Zinc Stearate | Ethylene bissteara-mide | Uncoated Capsules | Coated Capsules Stearic Acid | Wax |
|---|---|---|---|---|---|
| Flow Rate in sec./50 g. | 34.5 | 41.0 | no flow | no flow | no flow |
| Apparent Density in g./cc | 3.24 | 2.94 | 2.58 | 2.95 | 2.66 |
| Green Density in g./cc | 6.60 | 6.55 | 6.55 | 6.60 | 6.52 |
| Ejection Force in t.s.i. | 5.4 | 6.4 | 5.6 | 4.9 | 5.7 |
| Green Strength in p.s.i. | 1664 | 2218 | 1437 | 1175 | 1423 |

The results show that the stearic acid coated microcapsules give higher apparent densities and green densities than do the uncoated.

EXAMPLE XIII

Coating of microcapsules from Example VII with thin layers of lubricants.

Four samples, each weighing 83 g., of coarse microcapsules from Example VII were heated to 150° F. and to each was added 17 g. of a coating material. Four materials were used: double pressed stearic acid, Fischer Tropsch Wax, hydrogenated castor fatty acid and carnauba wax. The samples were held at 150° F. and mixed for 30 minutes. They were then allowed to cool at room temperature with constant mixing. Any aggregates of coated microcapsules that had formed were broken by light grinding.

The coated microcapsules were tested as lubricants for iron powder Atomet 29 (trademark) using concentrations of 0.50% and 0.75% by weight. Table IV presents the results along with those for customarily used lubricants.

The results show that when coarse microcapsules are coated there is a spectacular improvement in the flow rate and apparent density. Although no results are shown, it was found that coating the capsules increased the green strength, but had no significant effect on other properties.

TABLE IV

Effect of Various Coatings on Lubricant Properties

| | Concentration of Lubricant | Flow Rate in sec./50 G. | Apparent Density in g./cc. |
|---|---|---|---|
| Ethylene Bisstearamide | 0.50% | 32.0 | 2.73 |
| | 0.75% | 35.0 | 2.62 |
| Uncoated Microcapsules | 0.50% | no flow | 2.38 |
| | 0.75% | no flow | — |
| Stearic Acid Coated Capsules | 0.50% | 39.5 | 2.71 |
| | 0.75% | 37.5 | 2.67 |
| Fischer Tropsch Wax Coated Capsules | 0.50% | 30.5 | 2.61 |
| | 0.75% | 35.0 | 2.54 |
| Castor Fatty Acid Coated Capsules | 0.50% | — | — |
| | 0.75% | 38.5 | 2.60 |
| Carnauba Wax Coated | 0.50% | — | — |
| | 0.75% | 37.0 | 2.61 |

EXAMPLE XIV

Methyl Lardate encapsulated in the reaction product from Ethylene Diamine and Trimethyl Hexamethylene Diisocyanate.

30 g. of trimethyl hexamethylene diisocyanate was dissolved in 120 g. of methyl lardate. This solution was added with stirring to a solution of 3 g. of Siponic 218 (trademark) in 700 g. of water. When the emulsification was complete, the stirring rate was reduced and 30 g. of ethylene diamine dissolved in 70 g. of water was added. The temperature was then increased to 80° C. and maintained constant while the mixture was stirred for 4 hours.

The resulting dispersion of microcapsules in water was filtered and the microcapsules dried at 60° C. Aggregates of microcapsules were broken by light grinding.

The microcapsules were white, spherical, free flowing, had an average particle size of 50 microns and contained approximately 66% by weight methyl lardate.

EXAMPLE XV

Methyl lardate encapsulated in the reaction product from propylenediamine and trimethyl hexamethylene diisocyanate.

The same procedure was followed as in Example XIV except that 32 g. of propylene diamine were used instead of 30 g. of ethylenediamine.

The resulting microcapsules were white, spherical, free flowing, had an average particle size of 50 microns and contained approximately 66% methyl lardate.

EXAMPLE XVI

Rapeseed oil encapsulated in polymerized divinylbenzene.

25 g. of divinylbenzene were dissolved in 60 g. of rapeseed oil. This solution was added with vigorous stirring to a solution of 0.5 g. of Siponic 218 in 700 g. of water. When the emulsification was complete, the stirring rate was reduced and the temperature raised to 80° C. Then, 2 g. of potassium persulphate were added and the mixture stirred at 80° C. for 6 hours. The temperature was allowed to drop to 25° C. At this point, the mixture was filtered, and the microcapsules washed and then dried at 45° C. The dried capsules were gently ground to break any aggregates.

The final microcapsules were white, spherical, free flowing, had an average particle size of 20 microns and contained approximately 70% by weight rapeseed oil.

EXAMPLE XVII

Isotearic acid encapsulated in polymerized divinylbenzene.

The same procedure was followed as in Example XVI, except that 60 g. of isostearic acid was used instead of 60 g. of rapeseed oil.

The resulting microcapsules were white, spherical, free flowing, had an average particles size of 20 microns and contained approximately 70% by weight isostearic acid.

EXAMPLE XVIII

Effect of mixtures of ethylenebisstearamide wax and microcapsules from Example VIII on brass powder.

Figure 4:
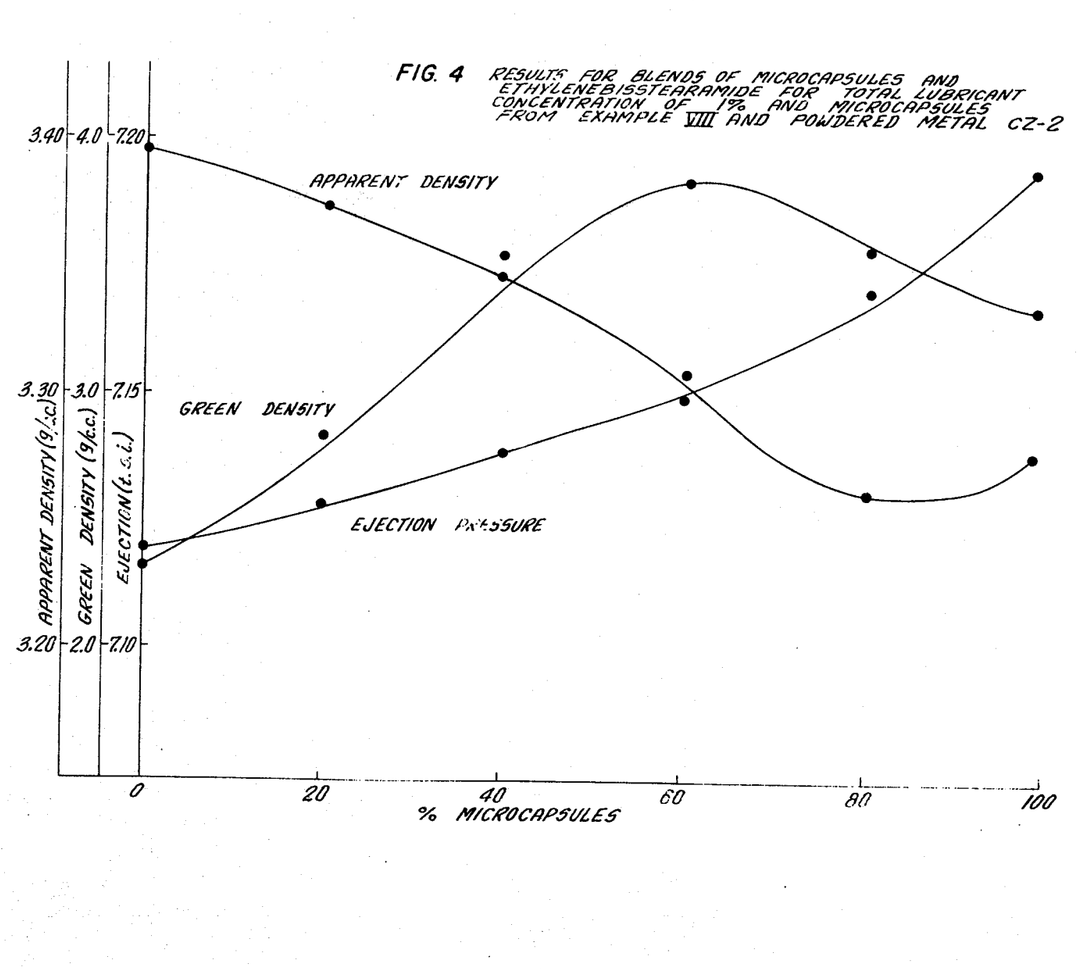
FIG. 4 shows graphically the variation in ejection pressure, apparent density and green density for brass powder (CZ-2, trademark) containing 1% by weight of lubricant comprising microcapsules admixed with ethylenebisstearamide, with microcapsule concentration, for the microcapsules of Example VIII.

Blends of microcapsules and a conventional lubricant were prepared and tested using CZ-2 (trademark) brass powder (from Canada Metals Limited). FIG. 4 gives the results for blends of ethylenebisstearamide wax with the fine particle size microcapsule prepared in Example VIII. The total concentration of lubricant was held constant at 1% by weight. Here again synergism occurs and there is a maximum in the green density, which in this case occurs at a concentration of microcapsules of approximately 60% by weight. In contrast to the results for iron powders, the ejection pressure increases with the addition of microcapsules.

EXAMPLE XIX

Epoxidized soyabean oil encapsulated in the reaction product from ethylene diamine and polymethylene polyphenylisocyanate.

13.5 g. of polymethylene polyphenylisocyanate (Mondur MRS, trademark from Mobay Chemical Company) was dissolved in 76.5 g. of epoxidized soyabean oil (Paraplex G-62, trademark from Rohm and Haas). The solution was added with stirring to a solution of 3 g. of Siponic 218 (trademark) in 700 g. of water. The resulting coarse emulsion was then mixed very vigorously in a high intensity colloid mill to produce an emulsion containing very fine droplets of oil. The stirring rate was then reduced and 3.5 g. of ethylene diamine in 10 g. of water was added. The temperature was then increased to 80° C. and maintained constant while the mixture was stirred for 4 hours.

The microcapsules were separated from the water by filtration and dried at 60° C. Aggregates of dried microcapsules were broken by gentle grinding.

The microcapsules were white, spherical, free flowing, had an average diameter of 5 microns and contained 85% oil. When tested as lubricants for powderred metals they gave results similar to those obtained with unepoxidized soyabean oil.

EXAMPLE XX

Effect of mixtures of zinc stearates and microcapsules from Example VIII on iron powder.

Blends of zinc stearate (from H. L. Blachford, Limited) and microcapsules from Example VIII were prepared and tested using Atomet 29 (trademark) from Quebec Metal Powder Company. The total concentration of lubricant was held constant at 1% by weight. Although, no maximum occurred in the plot for green density, a minimum occurred in the ejection force at approximately 60% microcapsule content, showing once again the existence of synergism.

I claim:

1. A method of producing a sintered metal part from powdered metal comprising
   blending said powdered metal with a lubricant comprising discrete pressure-rupturable microcapsules comprising a core of a non-corrosive liquid organic lubricant able to wet said powdered metal, and surrounding said core a thin polymeric solid shell, to form an intimate mixture,
   compacting said mixture in a mould at a pressure effective to rupture said shell and release said liquid lubricant and to form said mixture into a self-supporting shaped body,
   removing said body from said mould,
   heating said body to decompose and remove organic material, and
   sintering said metal particles.

2. A method according to claim 1 wherein said lubricant is a synergistic mixture of said microcapsules and a solid unencapsulated particulate powder metallurgy lubricant.

3. A method according to claim 1 wherein said shell has at its outer surface a thin coating of a solid lubricant for metal powders.

4. A method according to claim 1 wherein said powdered metal is a powdered metal alloy.

5. A method according to claim 1 wherein said powdered metal is a mixture of metal powders.

6. A method according to claim 1 wherein said powdered metal comprises iron powder.

7. A method according to claim 6 wherein said iron powder contains graphite as an additive.

8. A method according to claim 1 wherein said liquid organic lubricant comprises a fatty acid ester.

9. A method according to claim 2 wherein said unencapsulated lubricant is an amide wax.

10. A method according to claim 9 wherein said amide wax is ethylenebisstearamide.

11. A method according to claim 2 wherein said unencapsulated lubricant is a metal stearate.

12. A method according to claim 11 wherein said metal stearate is zinc stearate.

* * * * *

UNITED STATES PATENT OFFICE
CERTIFICATE OF CORRECTION

Patent No. 4,002,474        Dated January 11, 1977

Inventor(s) JOHN BLACHFORD

It is certified that error appears in the above-identified patent and that said Letters Patent are hereby corrected as shown below:

IN THE SPECIFICATION:

Column 2, line 62, change "examle" to ---example---.

Column 3, line 6, change "sheel" to ---shell---.

Column 4, line 28, change "powedered" to ---powdered---.

Column 7, line 36, change "Alcolar" to ---Alcolac---.

Column 10, line 54, change "cruve" to ---curve---.

Column 11, line 14, change "dissoved" to ---dissolved---;

line 17, change "as" to ---has---;

line 46, change "shows" to ---show---.

Column 12, Table III, correct the heading to read as follows:

---

Effect of Thin Coating on Lubricant Properties

| Zinc Stearate | Ethylene bissteara-mide | Uncoated Capsules | Coated Capsules Stearic Acid | Wax |
|---|---|---|---|---|

---

UNITED STATES PATENT OFFICE
CERTIFICATE OF CORRECTION

Patent No. 4,002,474                    Dated   January 11, 1977

Inventor(s)  JOHN BLACHFORD

It is certified that error appears in the above-identified patent and that said Letters Patent are hereby corrected as shown below:

Column 14, line 52, change "Isotearic" to ---Isostearic---.

Column 15, line 34, change "powderred" to ---powdered---.

Signed and Sealed this

Nineteenth Day of April 1977

[SEAL]

Attest:

RUTH C. MASON
*Attesting Officer*

C. MARSHALL DANN
*Commissioner of Patents and Trademarks*